United States Patent [19]
Heilborn et al.

[11] Patent Number: 5,803,019
[45] Date of Patent: Sep. 8, 1998

[54] DISPLAY ENVIRONMENT FOR REPTILES AND OTHER PETS

[76] Inventors: Eric W. Heilborn, 2216 I St.; Michael A. Blain, 1108 Donovan Ave., both of Bellingham, Wash. 98225

[21] Appl. No.: 640,547

[22] Filed: May 2, 1996

[51] Int. Cl.⁶ .................................................. A01K 31/00
[52] U.S. Cl. ............................................................ 119/475
[58] Field of Search ........................... 119/452–456, 461, 119/464, 472–475, 489, 491, 492, 496–498, 504, 512, 513, 514

[56] References Cited

U.S. PATENT DOCUMENTS

| | | |
|---|---|---|
| 3,585,968 | 6/1971 | Stone, Jr. . |
| 3,698,360 | 10/1972 | Rubricius . |
| 4,729,343 | 3/1988 | Evans . |
| 4,793,286 | 12/1988 | Buxton . |
| 4,803,951 | 2/1989 | Davis ........................................ 119/497 |
| 4,819,582 | 4/1989 | Lichvar ..................................... 119/497 |
| 4,850,306 | 7/1989 | Nitkin ....................................... 119/455 |
| 5,078,096 | 1/1992 | Bishop et al. . |
| 5,277,148 | 1/1994 | Rossignol et al. ....................... 119/453 |
| 5,564,367 | 10/1996 | Boyanton .................................. 119/474 |

*Primary Examiner*—Thomas Price
*Attorney, Agent, or Firm*—Todd N. Hathaway

[57] ABSTRACT

A reptile habitat assembly having a knock-down frame formed of a plurality of structural members joined by corner connectors. The rectangular framework is covered by a fabric screen enclosure having zippered flap at one end, which permits the framework to be inserted into the fabric cover as a unit the its fully assembled condition. Snap-fit, one-piece plastic floor and back panels mount to the tubular framework, and have receptacles for holding water, food, plants, and other features to create a naturalistic appearance. The screen covered frame structure is lightweight and shrinkable, using connectors between vertically-adjoining corner members, and the knock-down construction facilitates compact packaging for shipment, storage, and point of sale display.

28 Claims, 4 Drawing Sheets

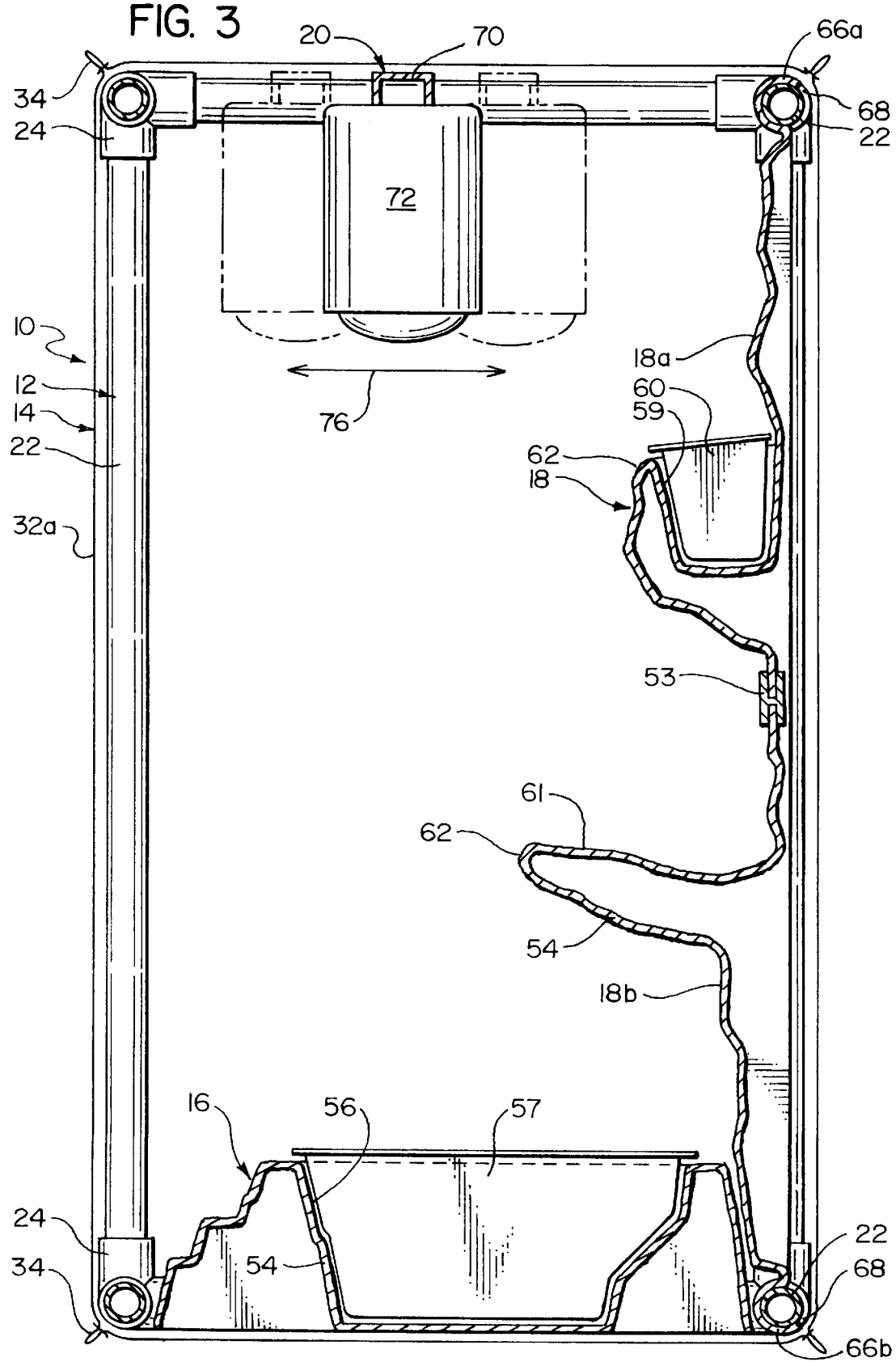

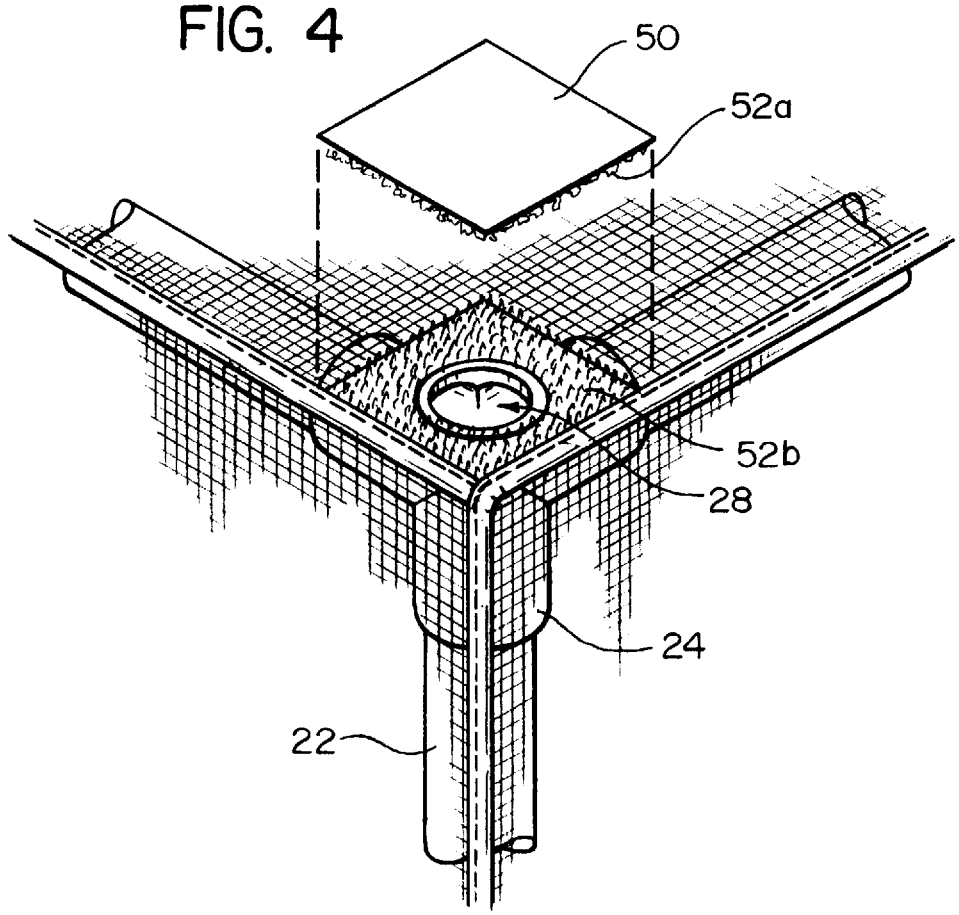

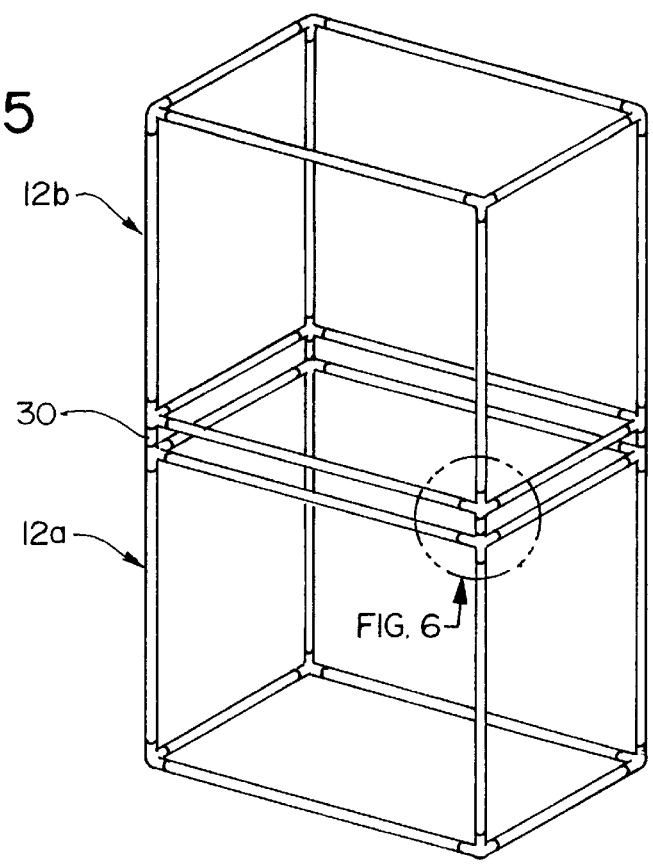
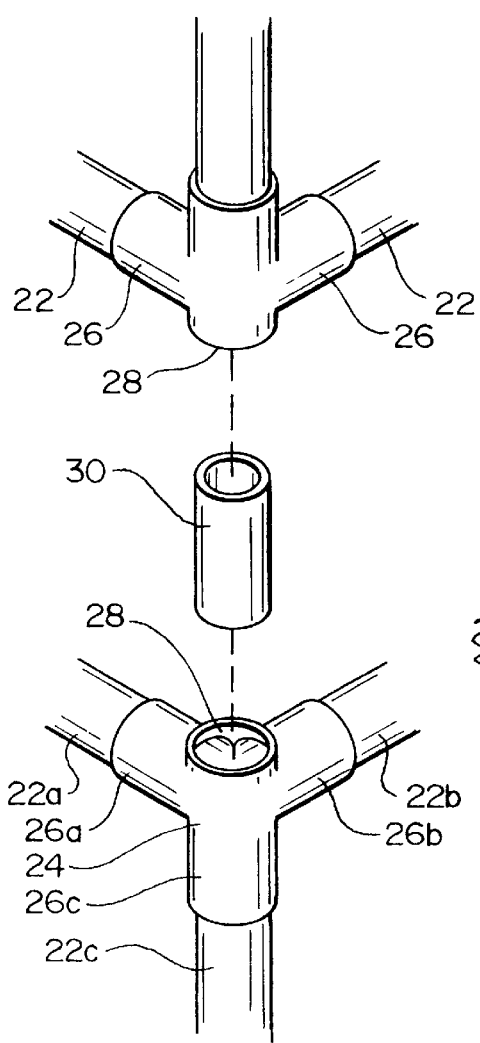
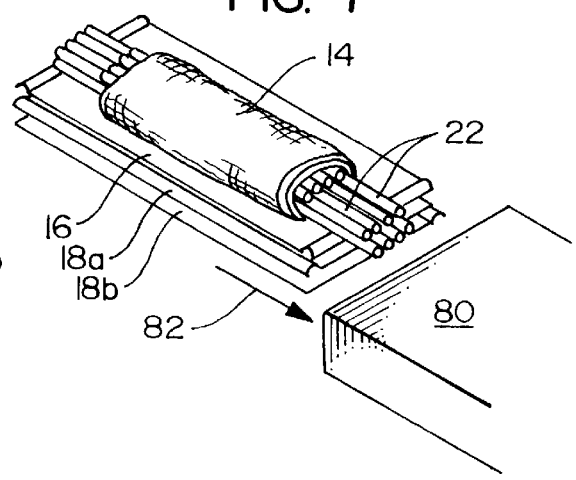

DISPLAY ENVIRONMENT FOR REPTILES AND OTHER PETS

BACKGROUND a. Field of the Invention

The present invention relates generally to display apparatus for the keeping of pet animals, and, more particularly, to a collapsible living environment for keeping and displaying pet reptiles and similar animals.

b. Background Art

The keeping of pet reptiles has become an increasingly popular pastime. Examples of such reptiles include not only various types of snakes, but also large and small lizards, many of which display vivid coloring patterns or other distinctive features.

The hobby has, however, been somewhat hampered by the unavailability of suitable units for maintaining and displaying the animals. To date, enthusiasts have generally tried to make do with containers and tanks which were originally intended for use with other types of animals, and this has led to a number of problems. For example, the most common approach has been to keep the reptiles in glass aquariums which were designed for the keeping of tropical fish. Since the aquariums are intended to hold large quantities of water, these are typically constructed of heavy gauge glass panes, glued together at the edges and/or assembled within a plastic or metal frame. When these are used for displaying reptiles, the owner typically arranges an environment of wood/stones/plants in the bottom of the aquarium, along with dishes for holding food and water.

This makeshift use of aquariums results in a number of problems in practice. Firstly, the glass panes quickly become dirty and difficult to see through, due to the movements and activities of the animal; this necessitates frequent scrubbing of the inside of the glass, or otherwise the display quickly becomes unsightly. Also, the smooth glass bottom surface of the aquarium makes it difficult or impossible to secure the food/water dishes and environmental "props" and in place, with the result that these quickly become dislodged and disorganized by the movements of the animal or owner. Furthermore, reflections from the glass, especially from house lighting or nearby windows, can make it very difficult to actually see the animal or animals inside the aquarium. Similar products, such as terrariums constructed with clear plastic panels, share these problems, as well as the additional drawbacks of scratching and poor durability.

Still further (and very much different from the situation with tropical fish), proper care for reptiles typically requires that they be exposed to outdoor sunlight on a regular basis. Simply put, glass aquariums are too heavy and fragile to be moved in and out of the house on a routine basis, and any attempt to do so is simply inviting disastrous consequences. Moreover, the UV-filtration effects of the glass panes would limit the benefits of the sunlight exposure, even if the aquarium were to be positioned adjacent to an open window. As a result, most owners resort to removing the animal from the aquarium and carrying it outside into the sunlight; this, in turn, requires that the reptile be kept under constant surveillance while outside, lest it escape or come under attack from other neighborhood animals.

Yet another set of problems concerns the manufacture, shipment, and display of the articles prior to sale. Glass aquariums are expensive to construct, and this is reflected in their high retail prices. Because of this, it is prohibitively expensive for a pet owner to maintain multiple environments for pet reptiles. Moreover, even if the owner is able to afford more than one aquarium, this presents a severe space problem, especially in an apartment or small house: Because access to the aquariums is through the open tops, these cannot be stacked on top of one another (because it would be impossible to access the animal in the lower aquarium or to provide it with food and water), and furthermore the heavy aquariums are not structurally sound for stacking.

Also, because aquariums and similar devices (such as plastic terrariums) are rigid, unitary structures, these must be shipped from the manufacturer fully assembled; since these essentially constitute a large, empty box when assembled, and because freight charges are typically based in part on volume, this means that transportation costs can be excessively high for this type of product. Moreover, the shelf space which is required to stock and display a particular product is of great concern to most retailers, especially in a mass market environment; as a result, the bulky, inefficient shape of aquariums represents a serious problem for many merchants, as do the excessive weight and breakage problems which are associated with this type of product.

Accordingly, there exists a need for a display environment which is particularly suited for use with reptiles and similar pet animals. Moreover, there is a need for such an apparatus which is durable, yet inexpensive to manufacture, and which can be shipped, stored, and displayed at the point of sale in a compact configuration. Still further, there is a need for such an apparatus in which multiple units can be stacked for display without impairing access to the animals, and in which the animals can be transported outside for exposure to unfiltered sunlight. Still further, there is a need for such an apparatus which provides an attractive display in an environment having a natural appearance, and which is stable and requires minimal maintenance by the owner.

SUMMARY OF THE INVENTION

The present invention has solved the problems cited above, and is an animal habitat assembly, comprising (a) a plurality of elongate, substantially rigid structural members detachably mountable to one another for forming a framework with surrounds a living area for an animal, and an enclosure formed of a fabric screen material, the fabric enclosure being configured to conform closely to the framework so as to surround the living area, the fabric enclosure also having a detachable flap for forming an opening for receiving the framework therein when said framework is in a fully assembled configuration.

Preferably, the structural members of the framework comprise a plurality of elongate, substantially straight structural members, and a plurality of corner pieces for detachably joining the structural members in end-to-end relationship so as to form the framework. Each corner piece may comprise at lease three sleeve portions extending orthogonally to one another for receiving the structural members at the corners of a rectangular framework which surrounds the living area.

The fabric enclosure, in turn, may comprise five rectangular fabric panels joined in edge-to-edge relationship so as to form an enclosure for covering five sides of the rectangular framework, the detachable flap being connected to the panels so as to enclose a sixth side of the rectangular framework and so as to permit access to the living area therethrough. The detachable flap may be a rectangular fabric member, and may comprise a means for permanently attaching the first edge of the flap to an edge of one of the fabric panels, and means for detachably attaching the other three edges of the flap to edges of the fabric panels around an edge of the opening. The means for detachably detaching the edges of the flap around the edge of the opening may be a zipper member which extends along three edges of the opening and the flap.

The animal habitat may further comprise at least one rigid panel member which is detachably mountable to first and second parallel-extending structural members of the framework, inside of the fabric screen cover. The rigid panel member may comprise one receptacle portion formed integrally therein. The panel members may comprise a floor panel member for extending in a generally horizontal direction across the bottom of the framework, and a rear panel member for extending in a generally vertical direction across the back of the framework. The receptacle portion in the floor panel may comprise at least one downwardly-extending receptacle configured to hold food or water for an animal therein, and the at least one receptacle in the rear panel member may comprise an outwardly-extending receptacle configured to hold a live plant therein.

Each panel member may comprise a continuous sheet of thin, substantially rigid plastic material having the receptacle molded therein; the rigid plastic material may be a vacuum molded thermoplastic material. Each rigid panel member may further comprise attachment means formed integrally therein for detachably mounting first and second edge portions thereof to the parallel-extending structural members of the framework. The thin plastic material of the panel member may be a resiliently flexible material, and the attachment means may comprise channel portions formed along the first and second edge portions of the panel member, each channel portion having a receiving area for holding a structural member therein and a longitudinally extending opening, the opening having a width which is sized smaller than the width of the structural member so that edges of the opening flex apart in response to the structural member being forced into the opening, and snap back so as to retain the structural member within the channel member as the structural member enters the receiving area thereof.

The structural members may be tubular members having a circular cross-section, and receiving area of the channel member may have a semi-circular cross-section which corresponds generally to that of the tubular structural member and extends over more than half the circumference thereof.

The animal habitat may further comprise a lighting unit in slideable engagement with first and second parallel-extending upper structural members of the framework. The lighting unit may comprise at least one lighting fixture, and a bar member for supporting the lighting fixture over the living area, the bar member being configured to extend across the tops of the upper structural members so as to be supported thereby. The bottom member may comprise an inverted channel member having a lower channel portion for receiving a power cord therein, and a smooth upper surface for avoiding abrasion of the fabric enclosure. Cutout portions may be formed at first and second ends of the channel member for engaging top surfaces of the upper structural members so as to permit forward-to-rear sliding motion of the light support bar along the upper structural members, and so as prevent end-to-end sliding motion of the bar across the structural members.

BRIEF DESCRIPTION OF THE DRAWINGS

FIG. 3 is an end view of a cross-section taken through the assembly of FIG. 1, showing the relationship of the "knock-down" framework and fabric-mesh covering, and the internal rigid panels and lighting units which mount to the framework;

FIG. 4 is a perspective view of a corner of the assembly of FIG. 1, showing the manner in which the corners of the fabric screen cover are provided with removable patches for exposing attachment areas at the corners of the tubular framework for vertical stacking of the assemblies;

FIG. 5 is a perspective view of the frameworks of first and second assemblies in accordance with the present invention stacked on top of one another with the corner units in vertical engagement, these being shown without the fabric covers and other components for ease of understanding;

FIG. 6 is an enlarged, perspective view of a vertically adjoining pair of corner units of the stacked assemblies of FIG. 5, showing the manner in which these are connected by a vertically extending joiner segment which is received in the socket portions of the upper and lower corner units; and FIG. 7 is a perspective view of the apparatus of FIG. 1 in a disassembled condition, showing the manner in which this can be arranged for compact shipment and storage in a relatively flat box.

DETAILED DESCRIPTION a. Overview

Figure 1:
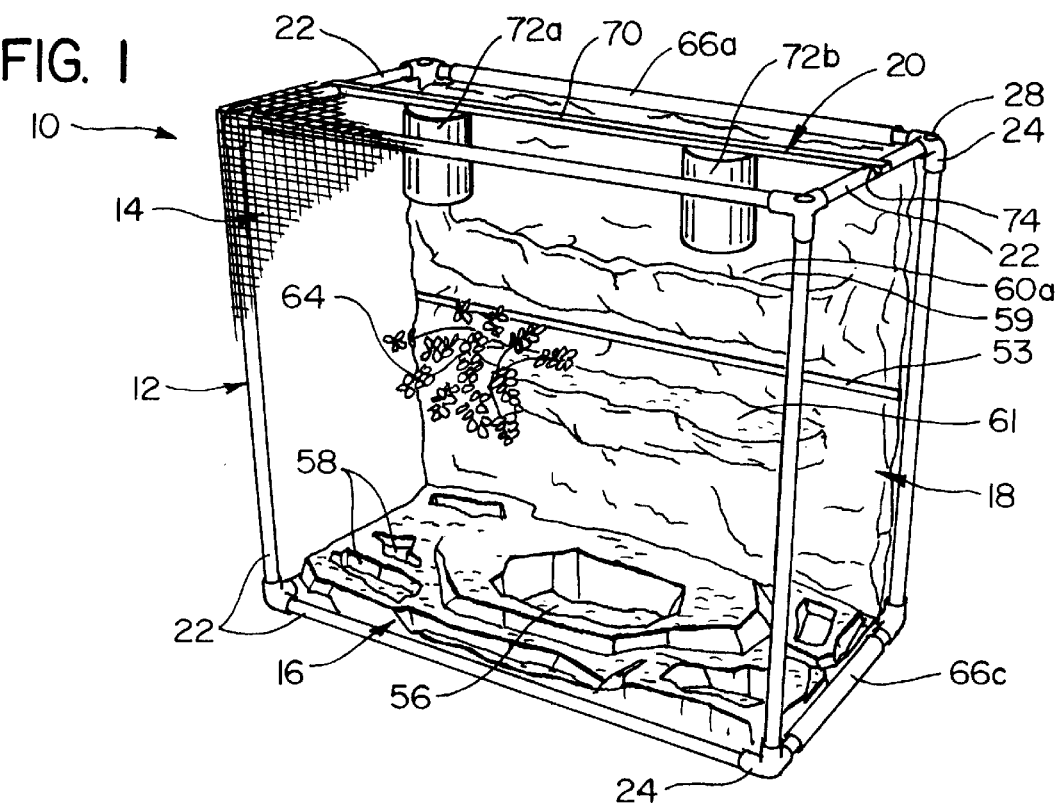
FIG. 1 is a perspective view of a reptile environment in accordance with the present invention, this being shown fully assembled to provide a natural-appearing environment for the animal.

FIG. 1 shows a reptile environment assembly 10 in accordance with the present invention. As can be seen, this comprises a rectangular framework 12 covered by a fabric screen enclosure 14. As will be described in greater detail below, the tubular framework 12 "knocks down" for storage/shipment, and the fabric screen enclosure similarly folds down to a compact mass.

The assembly 10 also includes a rigid floor panel 16 and back panel 18 which detachably mount to the structural members of framework 12; as will be described in greater detail below, the floor panel contains recesses for holding removable food and water dishes, plants, and other environmental materials, and the back panel 18 similarly contains outwardly extending shelves and recesses for holding plants or planter trays and other materials. As will be described in greater detail below, each of the panels is formed as a one-piece, molded member, and these easily mount to the tubular frame members using a "snap fit" attachment.

Furthermore, the framework 12 provides support for additional accessories, such as the light bar 20 which is shown in FIG. 1.

b. Framework

In the embodiment which is illustrated in FIG. 1, the framework includes a plurality of elongate, tubular structural members 22, adjoined by corner pieces 24. 0.84" O.D. extruded ABS plastic is eminently suitable or this use, however, the elongate structural members 22 may be formed of any suitable material, such as tubular HDPE, PVC, styrene, or GRP. Also, it should be noted that, while the cylindrical tubing material which is used in the illustrated embodiment has the advantages of low cost, ready availability, ease of assembly, and lack of sharp edges, materials having other cross-sections (e.g., square or rectangular) may be employed in some embodiments, with the corner pieces 24 being configured accordingly.

The corner pieces themselves may be formed of any suitable material, with an injection molded plastic such as styrene, PVC or HDPE or similar materials being particularly suitable. As can be seen in FIG. 1 and in greater detail in FIG. 6, each of the corner pieces 24 is a unitary member having three, orthogonally-extending sleeve portions 26a–c, which receive the tubular structural members 22a–c to form the corner of the rectangular structure. The sleeve portions are configured to receive the ends of the structural members in friction-fit therewith (glue may also be used in some embodiments). Although the tube-and-socket corner construction has the advantages of strength, ease of assembly, and economy of manufacture, other types of corner fixtures may be used in the present invention, such as various bolted, screwed, glued, and snap-together fittings, for example.

Also, each of the corner pieces is preferably provided with a vertical-axis socket portion 28. As can be seen in FIG. 6 and also FIG. 5, when the assemblies (frameworks 12a, 12b only shown in FIG. 5) are stacked on top of one another, the socket portions 28 at the adjoining corner pieces align vertically with one another; this permits a short connector piece 30, which may be, for example, a short piece of the same tubular material as forms the structural members 22 or a short wooden dowel or metal pin, to be inserted into the upper and lower sockets 28, thereby joining the assemblies together in a stable, vertically stacked structure. Connector pieces or similar parts may also be installed in the bottom corner pieces of the lower assembly to provide legs or feet for raising this of off the floor.

As will be described in greater detail below, the tubular framework 12 can be shipped by the manufacturer in an compact, unassembled condition, and can be easily erected by the purchaser by simply pressing the elongate structural members into the corner pieces. Moreover, the framework is light and strong, and it is possible to produce various sizes by simply varying the lengths of the structural members 22.

c. Fabric Cover

Figure 2:
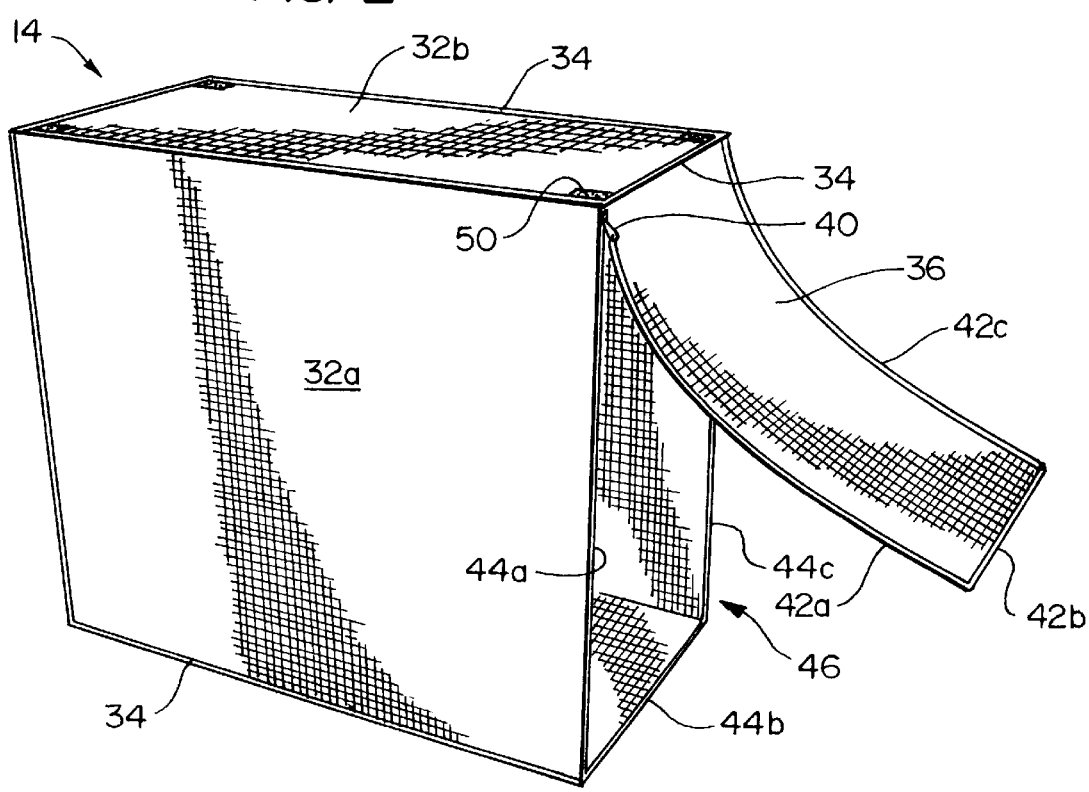
FIG. 2 is a perspective view of the fabric screen covering which encloses the tubular framework and other elements of the assembly of FIG. 1.

FIG. 2 shows the fabric cover 14 which fits over the framework 12 of the assembly 10. In FIG. 2, the cover is shown in an extended, taught configuration, but without the internal framework, for clarity of illustration.

The fabric-mesh cover includes a plurality of panels 32 formed of a fabric screen material, such as a relatively fine weave nylon or polyester screen material, for example. Although the material is shown stretched more or less taught in FIG. 2, for purposes of illustration, it will be understood that the fabric panels 32 are soft and flexible, so that the assembly can be collapsed, folded, and/or rolled up into a compact form. An 18×16 per square inch nominal count mesh screen formed of woven permanent glass yarns covered with a protective vinyl is eminently suitable for this purpose. The open mesh of the fabric screen contains the animal while affording a clear view to observers; also, the fabric screen permits a virtually unobstructed flow of fresh air to reach the animal, and cannot be streaked, smeared or scratched like smooth glass or plastic.

As is shown, there are preferably five of the fabric panels 32a–e, which are joined along fabric seems 34 so as to form five of the sides of a rectangular "box" which corresponds to the shape of the erected framework 12 (see FIG. 1); the size of the fabric cover is selected to be large enough for the erected framework to be slipped onto it without excessive strain on the material or seams, but not so large as to allow excessive slack to develop in the panels once the framework has been installed. Although the panels 32 may be stitched/bonded directly to one another in some embodiments, or these may be formed of a continuous piece of fabric screen material which extends around four sides of the rectangular structure, in the embodiment which is illustrated the panels 32 are preferably joined by seams 34 which are formed of a separate, abrasion-resistant fabric material, such as nylon or cotton bias tape, for example.

At one end of the rectangular fabric "box" (or at both ends in some embodiments), there is a fabric flap member 36 which is permanently attached to a seam 34 along its upper edge only. A zipper 40 extends along the other three edges 42a–c for detachably fastening the flap to the corresponding edges 44a–c at the end of the fabric "box". The panel 36 is formed of the same fabric screen material as the other panels 32, so that when the end panel is zipped shut, this matches the remainder of the fabric enclosure in appearance. Then, when this is unzipped, the end flap 36 can be lifted as shown in FIG. 2, so as to form an opening 46 into the interior of the fabric enclosure.

The opening provided by the zippered end flap 36 serves two important functions. Firstly, this arrangement permits the fabric cover 14 to be slipped on and off of the framework 12, after the latter has been erected by the purchaser: The purchaser simply inserts the structural members 22 and the corner pieces 24 to erect the framework 12 and then (after installation of the panel sections and other accessories as described below) the assembly is inserted through the opening 46 and the fabric cover is slipped into position. Similarly, the fabric cover can very easily be removed for cleaning or washing.

The second important advantage provided by the end flap is that this permits access to be gained to the interior of the assembly 10 so as to be able to remove the animal, add fresh water or food, remove waste, and so forth. Not only is this easier than reaching downwardly through the top of an aquarium or similar structure, but it makes it possible to carry out these functions when the assemblies are stacked vertically atop one another, as shown in FIG. 5.

Although a zipper is generally preferred for securing the edges of the end flap 36, it will be understood that other fasteners may be used in place of or in conjunction with the zipper, such as snaps, buttons, and Velcro™ hook-and-loop fabric, for example.

Preferably, the fabric mesh of the screen enclosure 14 is formed of a material having a matt-black color, since this makes it easier to observe the reptile or other animal within the assembly, by minimizing any surface reflection from the fabric panels. Also, unlike glass panes, the fabric screen material permits unfiltered UV light to reach the animal if the assembly is carried outside or placed adjacent an open window. Also, the fabric material is very lightweight, so that this (in conjunction with the other lightweight components of the assembly) makes it very easy for the person to carry the assembly in and out of the house, so that the animal can be exposed to sunlight on a routine basis, and can also be left unattended without fear of the animal escaping or being attacked.

An additional feature of the fabric screen enclosure is that this is preferably provided with detachable corner patches 50 (see FIG. 4). As is shown, the patches can suitably be a small pieces of fabric (e.g., nylon fabric) which are secured to the corners of the top and bottom panels of the fabric cover by means of hook-and-loop fastener material 52a, 52b (e.g., Velcro™ material). When the patch 50 is in place, this provides a smoothly finished appearance to the top/bottom panel of the fabric cover. However, if the owner desires to stack the assemblies as shown in FIG. 5, then the patches 50 can simply be pulled away from the underlying hook-and-loop layer 52b and removed, so as to expose the sockets 28 into which the joiner pieces 30 can be installed at each of the corners.

The removable fabric corner patches provide the assembly with a neat, finished aspect; in some embodiments, however, the corner openings may be provided by simple metal or plastic grommets or other fixtures.

d. Rigid Panel Units

The floor and back panel members 16 and 18 are shown in FIG. 1, and also in the cross-sectional view provided by FIG. 3. As can be seen, the rear panel is divided horizontally into upper and lower panel sections 18a, 18b, each of which has a width (in the vertical direction in FIG. 3) which is preferably approximately equal to that of the horizontal floor panel 16; as will be described in greater detail below, this facilitates the compact packaging of the disassembled structure. The lower edge of the upper panel section 18a is mounted to the upper edge of the lower section 18b by a joiner strip 53, which may be, for example, an extruded plastic strip having upper and lower slots or channels for receiving and holding the adjoining edges of the panel sections.

Preferably the material of which the panels are formed is at least semi-rigid so as to be able to support the weight of the materials which are contained in the receptacles formed therein, but is also resiliently flexible to a degree, so as to permit the snap-fit installation which is described in the following paragraph. As can perhaps best be seen in FIG. 3, each of the panel sections 16, 18a, 18b is a unitary structure, preferably formed of a relatively thin layer of plastic material 54, such as a thin, moldable styrene sheet material; examples of other suitable materials may include other types of plastics, fiberglass and composite materials, wood or paper products, and aluminum or other metals. Although the panels can be formed by any suitable means, vacuum molding or blow molding are generally preferred from the standpoint of economy.

As can be seen in FIG. 3, the bottom panel 16 is provided with downwardly extending receptacles, as are shown in FIG. 3 (see also FIG. 1). The receptacle areas are preferably formed with irregular contours so to enhance the natural appearance of the assembly, and include receptacles such as the area 56 which are specifically configured to hold removable food and/or water dishes 57 which nest in the bottom panel. Also, there may be additional receptacles 58 (see FIG. 1) for holding other materials, such as plants, stones, pieces of wood, and so on, as may be desirable for aesthetic purposes or for the care of the animal. Similarly, the vertically extending back panel 18 is provided with one or more outwardly extending cupor trough-shaped receptacles 59 for holding removable planter trays 60 or other additional materials and shelves 61 for providing a basking ledge or ledges for the animal. As can be seen in FIG. 3, in the embodiment which is illustrated these features are formed by outwardly extending hollow rim sections 62 formed of the thin layer of molded plastic material 54. As can be seen, the receptacles/ledges can be advantageously formed with a size, shape and strength for supporting the animal, or for holding live plants 64 so that these can trail over the vertical back panel and further enhance the natural appearance of the display environment. The receptacle 60a is thus preferably sized to hold sufficient soil and water to support the live plants, although in some embodiments artificial plant materials may be utilized, and the receptacles can therefore be smaller and/or more numerous than those shown in FIGS. 1 and 3; also, in some embodiments the food/water and planter trays may be a permanent planter part of their panels, rather than being removable as shown. The naturalistic effect is further enhanced by the irregular surface contours of the bottom and back panels, which may be formed to resemble rock, earth, sand, or other formations which occur in the creature's natural habitat.

As can also be seen in FIG. 3, each of the panels is provided with mounting channels 66 for engaging two parallel structural members along its edges, the mounting channels 66a, 66b of the back panel being shown in FIG. 3. As can be seen, each of the mounting channels comprises an elongate edge portion of the panel (see also FIG. 1) having a receiving area with a semi-circular cross-section which is configured to fit tightly against and partially surround the elongate structure member 22 along which that edge of the panel extends. The semi-circular wall of the channel extends over a distance somewhat greater than one-half the circumference of the tubular members 22; this allows the tubular member to be forced into the opening 68 of each of the mounting channels 66, and as this is done, the edges of the channel spread apart, and then the resilient material snaps back into place so as to firmly retain the structural member within the mounting channel.

As can be seen in FIG. 3, the mounting channels 66a, 66b are formed along the upper and lower edges of the back panel 18 so as to hold this firmly against vertical movement. The mounting channels 66c, 66d (see FIG. 1) of the bottom channel, in turn, are substantially similar to those of the back panel, and are formed to engage the structural members 22 at the right and left ends of the assembly. This configuration makes it very easy for the owner to snap the panels into place when assembling the structure, and eliminates the need for separate brackets, screws, bolts, or other fasteners.

e. Lighting Kit/Accessories

In addition to support of the fabric screen enclosure 14 and attachment of the floor and back panels, the elongate tubular members 22 of the framework provide support/attachment points for various accessories which the owner may wish to use to enhance the display environment. In particular, as can be seen in FIGS. 1 and 3, the assembly 10 may be provided with a light bar 20 having an elongate bridge bar 70 which spans the top of the assembly and supports electric light units 72, such as incandescent spot lamps. As can be seen in FIG. 3, the bridge bar 70 may be formed of an inverted length of plastic or metal channel material; the channel provides an underside area for routing a power cord (not shown) out of sight, while the smooth upper surface of the channel minimizes abrasion against the fabric material of the cover 14. Cutouts 74 are formed at the ends of the bridge bar 70 to engage the top surfaces of the parallel upper tubular members 22 in a sliding fit. As can be seen in FIG. 3, this permits the light bar 20 to be slid towards and away from the back panel of the assembly, in the direction indicated by arrow 76, so as to achieve optimized lighting for the animal environment, such as at the positions indicated by the broken line images in FIG. 3; the cutouts also prevent the bridge bar from sliding sideways and falling off of the support members.

In addition to the light bar unit 20 which is shown herein, the elongate structural members 22 provide suitable attachment points for other accessories, such as feeding or watering devices, toys, additional environmental "props" and the like, which may be supported from the structural members by hooks, fasteners, or other suitable devices. Also, the rigid structural members can support an external lighting assembly which is clamped or otherwise mounted on the outside of the enclosure.

f. Shipment, Storage, and Point of Sale Display

As was noted above, it is a particular advantage of the present invention that the assembly can be collapsed to a compact unit for storage and shipment, and can then very easily erected by the purchaser.

For example, as is shown in FIG. 7, the elongate structural pieces 22 and other components of the "knock-down" framework can be laid flat, along with the collapsible fabric screen enclosure 14 and the floor and back panels 16 and 18, to form a compact package which can be enclosed within a relatively flat box 80; as was noted above, because the back panel is divided in two, all three of the rigid panel sections 16, 18a and 18b have approximately the same width. This permits the use of efficient packaging that is impossible with an aquarium or similar structure, and also saves greatly on transportation costs. Moreover, the compact packaging makes it possible for the point of sale merchant to place much more of the product in a given amount of shelf space than would be possible with aquariums, plastic terrariums, or similar units.

The present invention has been described herein with particular reference to its use with reptiles, such as snakes and lizards; certain embodiments may, however, be particularly configured for use with other animals, such as amphibians or small mammals. Moreover, although the description has focussed on an embodiment of the invention which has a rectangular structure, which possesses the advantages of efficiency, simplicity, and economy of manufacture, it will be understood that the present invention may be embodied in structures having other shapes and forms, both rectilinear and curvilinear. It is therefore to be recognized that various alterations, modifications, and/or additions may be introduced into the constructions and arrangements of parts described above without departing from the spirit or ambit of the present invention as defined by the appended claims.

What is claimed is:

1. An animal habitat assembly, comprising:
    a plurality of elongate, substantially rigid structural members detachably mountable to one another for forming a framework which surrounds a living area for an animal, said. structural means comprising:
        a plurality of elongate, substantially straight structural members; and
        a plurality of corner pieces for detachably joining said structural members in end-to-end relationship so as to form said framework, each said corner piece comprising:
            at least three sleeve portions extending orthogonally to one another for receiving said structural members at corners of a rectangular framework which surrounds said living area; and an enclosure formed of a fabric screenmaterial, said fabric enclosure being configured to conform closely to said framework so as to surround said living area, said fabric enclosure further having a detachable flap for forming an opening for receiving said framework therein when said. framework is in a fully assembled configuration, said fabric screen material comprising:
    a collapsible, softly flexible fabric screen material having a mesh which permits substantially free passage of air and sunlight to an animal in said living area.

2. The animal habitat assembly of claim 1, wherein said fabric enclosure comprises:
    five rectangular fabric panels joined in edge-to-edge relationship so as to form an enclosure for covering five sides of said rectangular framework, said detachable flap being connected to said panels so as to enclose a sixth side of said rectangular framework and so as to permit access to said living area therethrough.

3. The animal habitat assembly of claim 2, wherein each said corner piece further comprises:
    a socket portion for extending in a vertical direction when said framework is in said assembled configuration, said socket portion being configured to receive an end of a joiner piece therein so as to connect vertically adjoining corner pieces of first and second vertically-stacked habitat assemblies.

4. The animal habitat assembly of claim 3, wherein said fabric screen enclosure further comprises:
    a plurality of small holes extending therethrough, each said hole being located at a corner of an upper fabric panel and a lower fabric panel of said enclosure so as to be located in register with a socket portion of a corner piece when said framework is received in said fabric enclosure, so as to permit the insertion of said joiner pieces through said hole and into said socket portion of said corner piece.

5. The animal habitat assembly of claim 4, wherein said fabric screen enclosure further comprises:
    a plurality of fabric patch members, each said patch member being detachably mounted to said corners of said upper and lower fabric panels so that said opening therethrough can be selectively exposed by removing said patch members.

6. The animal habitat assembly of claim 2, wherein said detachable flap is a rectangular fabric member and comprises:
    means for permanently attaching a first edge of said flap to an edge of one of said fabric panels; and
    means for detachably attaching the other three edges of said flap to edges of said fabric panels around an edge of said opening.

7. The animal habitat assembly of claim 6, wherein said means for detachably attaching said edges of said flap around said edge of said opening comprises:
    a zipper member extending along three edges of said opening and said flap.

8. The animal habitat assembly of claim 1, further comprising:
    at least one panel member which is detachably mountable to first and second parallel-extending structural members of said framework inside of said fabric screen enclosure.

9. The animal habitat assembly of claim 8, wherein said panel member comprises:
    at least one receptacle portion formed integrally therein.

10. The animal habitat assembly of claim 9, wherein said at least one panel member comprises:
    a floor panel member for extending in a generally horizontal direction across a bottom of said framework and
    a rear panel member for extending in a generally vertical direction across a back of said framework.

11. The animal habitat assembly of claim 10, wherein said at least one receptacle portion in said floor panel comprises:
    at least one downwardly-extending receptacle configured to hold food or water for an animal therein.

12. The animal habitat assembly of claim 11, wherein said at least one receptacle in said rear panel member comprises:
    an outwardly extending receptacle configured to hold a live plant therein.

13. The animal habitat assembly of claim 9, wherein said panel member comprises:
    a continuous sheet of thin, substantially rigid, plastic material having said at least one receptacle molded therein.

14. The animal habitat assembly of claim 13, wherein said thin, substantially rigid plastic material is a vacuum-molded thermoplastic material.

15. The animal habitat assembly of claim 13, wherein each said panel member further comprises:
   attachment means formed integrally with said panel member for detachably mounting first and second edge portions of said panel member to said parallel-extending structural members of said framework.

16. The animal habitat assembly of claim 15, wherein said thin plastic material is resiliently flexible and said attachment means comprises:
   channel portions formed along said first and second edge portions of said panel member, each said channel portion having a receiving area for holding a structural member therein and a longitudinally-extending opening, said opening having a width which is sized smaller than a width of said structural member so that edges of said opening flex apart in response to said structural member being forced into said opening and snap back so as to retain said structural member in said channel member as said structural member enters said receiving area thereof.

17. The animal habitat assembly of claim 16, wherein said structural members are tubular members having a circular cross-section, and wherein said receiving area of said channel portion has a semicircular cross-section which corresponds generally to said tubular structural member and extends over more than one-half a circumference thereof.

18. The animal habitat assembly of claim 9, further comprising:
   a lighting unit in slideable engagement with first and second parallel-extending upper structural members of said framework.

19. The animal habitat assembly of claim 18, wherein said lighting unit comprises:
   at least one lighting fixture; and
   a bar member for supporting said lighting fixture over said living area, said bar member being configured to extend across top surface of said upper structure members so as to be supported thereby.

20. The animal habitat assembly of claim 19, wherein said bar member comprises:
   an inverted channel member having a lower channel portion for receiving a power cord therein, and a smooth upper surface for avoiding abrasion of said fabric enclosure as said lighting unit is slid back and forth on said upper structural members.

21. The animal habitat assembly of claim 20, wherein said bar member further comprises:
   cutout portions formed at first and second ends of said channel member for engaging said top surfaces of said upper structural members so as to permit forward-to-rear sliding motion of said bar along said upper structural members and so as to prevent side-to-side sliding motion of said bar across said upper structural members.

22. An animal habitat assembly, comprising:
(a) a framework comprising:
   a plurality of elongate, substantially straight structural members;
   a plurality of corner pieces for detachably joining said structural members in end-to-end relationship so as to form a framework which surrounds a living area for an animal, each said corner piece having at least three sleeve portions extending orthogonally to one another for receiving said structural members at corners of a rectangular framework which surrounds said living area;

(b) an enclosure formed of a collapsible, softly flexible fabric screen material having a mesh which permits substantially free passage of air and sunlight to an animal in said living area, said fabric screen enclosure being configured to conform closely to said framework so as to surround said living area, said fabric screen enclosure comprising:
   five rectangular fabric panels joined in edge-to-edge relationship so as to form an enclosure for covering five sides of said rectangular framework; and
   a rectangular detachable fabric flap member, said detachable flap member being connected to said panels so as to enclose a sixth side of said rectangular framework and so as to permit access to said living area therethrough, said flap member comprising:
      means for permanently attaching a first edge of said flap to an edge of one of said fabric panels;
      a zipper member extending along the other three edges of said opening and said flap for detachably attaching said three edges of said flap to edges of said fabric panels around said opening; and (c) at least one rigid panel member which is detachably-mountable to first and second parallel-extending structural members of said framework in side of said fabric screen enclosure, said panel member being formed of a continuous sheet of thin, substantially rigid, plastic material, said at least one panel member comprising:
   a floor panel member for extending in a generally horizontal direction across a bottom of said framework and having at least one molded-in downwardly-extending receptacle configured to hold food or water for an animal therein; and
   a rear panel member for extending in a generally vertical direction across a back of said framework, and having at least one molded-in, outwardly-extending receptacle configured to hold a plant therein, each said panel member further comprising:
      channel portions formed along first and second edge portions of said panel member for detachably mounting said first and second edge portions to parallel-extending structural members of said framework,
      each said channel portion having a receiving area for holding a structural member therein and a longitudinally-extending opening, said opening having a width which is sized smaller than a width of said structural member so that edges of said opening flex apart in response to said structural member being forced into said opening and snap back so as to retain said structural member in said channel member as said structural member enters said receiving area thereof, said structural members being tubular members having a circular cross-section, and said receiving area of said channel portion having a semicircular cross-section which corresponds generally to said tubular structural member and extends over more than one-half a circumference thereof.

23. An animal habitat assembly, comprising:
   a plurality of substantially rigid structural members detachably mountable to one another for forming a framework which surrounds a living area for an animal, said structural members comprising:
   a plurality of elongate, substantially straight structural members; and
   a plurality of corner pieces for detachably joining said structural members in end-to-end relationship so as to form said framework;

an enclosure formed of a collapsible, softly flexible fabric screen material having a mesh which permits substantially free passage of air and sunlight to an animal in said living area, said fabric enclosure being configured to conform closely to said framework so as to surround said living area, said fabric enclosure further having a detachable flap for forming an opening for receiving said framework therein when said framework is in a fully assembled configuration; and at least one panel member which is detachably mountable to first and second parallel-extending structural members of said framework inside of said fabric screen enclosure.

24. The animal habitat assembly of claim 23, wherein said at least one panel member comprises:

a floor panel member for extending in a generally horizontal direction across a bottom of said framework; and a rear panel member for extending in a generally vertical direction across a back of said framework.

25. The animal habitat assembly of claim 24, wherein said floor panel comprises:

at least one downwardly-extending receptacle configured to hold food or water for an animal therein.

26. The animal habitat assembly of claim 23, wherein said panel member comprises:

a continuous sheet of thin, substantially rigid, plastic material having at least one receptacle molded therein.

27. The animal habitat assembly of claim 26, wherein each said panel member further comprises:

attachment means formed integrally with said panel member for detachably mounting first and second edge portions of said panel member to said parallel-extending structural members of said framework..

28. The animal habitat assembly of claim 27, wherein said thin plastic material is resiliently flexible and said attachment means comprises:

channel portions formed along said first and second edge portions of said panel member, each said channel portion having a receiving area for holding a structural member therein and a longitudinally-extending opening, said opening having a width which is sized smaller than a width of said structural member so that edges of said opening flex apart in response to said structural member being forced into said opening and snap back so as to retain said structural member in said channel member as said structural member enters said receiving area thereof.

* * * * *